(12) United States Patent
Xin et al.

(10) Patent No.: US 10,929,180 B2
(45) Date of Patent: Feb. 23, 2021

(54) TASK SCHEDULING METHOD, APPARATUS, ELECTRONIC DEVICE AND STORAGE MEDIUM

(71) Applicant: BAIDU ONLINE NETWORK TECHNOLOGY (BEIJING) CO., LTD., Beijing (CN)

(72) Inventors: Jiankang Xin, Beijing (CN); Zhuo Chen, Beijing (CN); Baisheng Wang, Beijing (CN); Wei He, Beijing (CN); Kaiwen Feng, Beijing (CN); Chao Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 49 days.

(21) Appl. No.: 16/550,502

(22) Filed: Aug. 26, 2019

(65) Prior Publication Data
US 2020/0073710 A1    Mar. 5, 2020

(30) Foreign Application Priority Data
Aug. 30, 2018    (CN) .......................... 2018 1 1005501

(51) Int. Cl.
*G06F 9/48*    (2006.01)
*G06F 9/50*    (2006.01)

(52) U.S. Cl.
CPC ............ *G06F 9/4881* (2013.01); *G06F 9/485* (2013.01); *G06F 9/4818* (2013.01); *G06F 9/5016* (2013.01)

(58) Field of Classification Search
CPC .................................................... G06F 9/4881
See application file for complete search history.

(56) References Cited

U.S. PATENT DOCUMENTS

2015/0106819 A1    4/2015    Kim et al.

FOREIGN PATENT DOCUMENTS

| CN | 101183964 A | 5/2006 |
| CN | 103064736 A | 4/2013 |
| CN | 103188723 A | 7/2013 |
| CN | 103823450 A | 5/2014 |
| CN | 103824233 A | 5/2014 |

(Continued)

OTHER PUBLICATIONS

Chinese Patent Application No. 201811005501.3 Second Office Action dated Aug. 5, 2020, 7 pages.

(Continued)

*Primary Examiner* — Charlie Sun
(74) *Attorney, Agent, or Firm* — Lathrop GPM LLP

(57) ABSTRACT

Embodiments of the preset disclosure provide a task scheduling method, an apparatus, an electronic device, and a storage medium. The method comprises traversing tasks in a current queue, and obtaining current values of current state information and a frequency parameter for each task that has been traversed, wherein the frequency parameter is a preset parameter for indicating a scheduled frequency of a corresponding task; selecting a task with the minimum scheduled frequency in the tasks having the current state information indicating an executable state as a target task according to the current values of the current state information and the frequency parameter for each task; and executing the selected target task, and updating the current value of the frequency parameter corresponding to the target task after the target task is executed.

9 Claims, 3 Drawing Sheets

(56) References Cited

FOREIGN PATENT DOCUMENTS

| CN | 104010374 A | 8/2014 |
| CN | 105786600 A | 7/2016 |
| CN | 106201765 A | 12/2016 |
| CN | 107273232 A | 10/2017 |

OTHER PUBLICATIONS

Chinese Patent Application No. 201811005501.3 English translation of Second Office Action dated Aug. 5, 2020, 8 pages.
Chinese Patent Application No. 201811005501.3 Office Action dated Mar. 25, 2020, 7 pages.
Chinese Patent Application No. 201811005501.3 English translation of Office Action dated Mar. 25, 2020, 8 pages.

TASK SCHEDULING METHOD, APPARATUS, ELECTRONIC DEVICE AND STORAGE MEDIUM

CROSS REFERENCE TO RELATED APPLICATION

This application claims priority to Chinese Patent Application No. 201811005501.3, filed with the State Intellectual Property Office of P. R. China on Aug. 30, 2018, the entire contents of which are incorporated herein by reference.

TECHNICAL FIELD

The embodiments of the present disclosure relate to a field of computer technology, and more particularly, to a task scheduling method, an apparatus, an electronic device, and a storage medium.

BACKGROUND

At present, algorithm modules operated in an unmanned vehicle system are applicable for sensing, planning, controlling, detecting of vehicle states, and positioning. Those algorithm modules are connected through information channels to form a complex topology structure of directed acyclic graph (DAG). One typical characteristic of the topology structure in the unmanned vehicle is that the frequency for transmitting/receiving data at different nodes are different, resulting in more complicated scheduling algorithms in the unmanned vehicle scheduling system than those in a conventional server due to the correlation among different nodes in the DAG Specifically, each node in the topology structure of DAG corresponds to a task. When data required for executing a certain task is generated, the state of the task in the queue is changed to an executable state. The tasks in the queue are traversed each time the scheduling is performed. When a task having current state information indicating the executable state is located during the traversing, the task is executed. If the frequency for transmitting/receiving data in a task is high, the task may be scheduled uninterruptedly for several times, resulting in unbalanced resource scheduling.

SUMMARY

Embodiments of the present disclosure provide a task scheduling method, an apparatus, an electronic device, and a storage medium, to solve the technical problem of unbalanced resource scheduling in task scheduling.

In a first aspect, the embodiments of the present disclosure provide a task scheduling method, comprising: traversing tasks in a current queue, and obtaining current values of current state information and a frequency parameter for each task that has been traversed, wherein the frequency parameter is a preset parameter for indicating a scheduled frequency of a corresponding task; selecting a task with the minimum scheduled frequency in the tasks having the current state information indicating an executable state as a target task according to the current values of the current state information and the frequency parameter for each task; and executing the selected target task, and updating the current value of the frequency parameter corresponding to the target task after the target task is executed.

In a second aspect, the embodiments of the present disclosure further provide a task scheduling apparatus, comprising: an information obtaining unit, configured to traverse tasks in a current queue, and to obtain current values of current state information and a frequency parameter for each task that has been traversed, wherein the frequency parameter is a preset parameter for indicating a scheduled frequency of a corresponding task; a target task determining unit, configured to select a task with the minimum scheduled frequency in the tasks having the current state information indicating an executable state as a target task according to the current values of the current state information and the frequency parameter for each task; and a target task executing unit, configured to execute the selected target task, and update the current value of the frequency parameter corresponding to the target task after the target task is executed.

In a third aspect, the embodiments of the present disclosure further provide an electronic device, comprising: one or more processors; a memory, configured to store one or more programs. When the one or more programs are executed by the one or more processors, the one or more processors implement the task scheduling method according to the embodiments of the first aspect.

In a fourth aspect, embodiments of the present disclosure further provide a computer readable storage medium having computer program stored thereon, and when the program is executed by the processor, a task scheduling method according to the embodiments of the first aspect is implemented.

In the embodiments of the present disclosure, the tasks in the current queue are traversed. Current values of current state information and a frequency parameter for each task that has been traversed are obtained. The frequency parameter is a preset parameter for indicating a scheduled frequency of a corresponding task. A task with the minimum scheduled frequency in the tasks having the current state information indicating an executable state is selected as a target task according to the current values of the current state information and the frequency parameter for each task. The selected target task is executed. The current value of the frequency parameter corresponding to the target task is updated after the target task is executed. By adopting the above solution, the target task may be determined by introducing the frequency parameter, which may solve the problem of unbalanced task scheduling in the related art and improve the stability of the task scheduling process.

DETAILED DESCRIPTION

Figure 1:
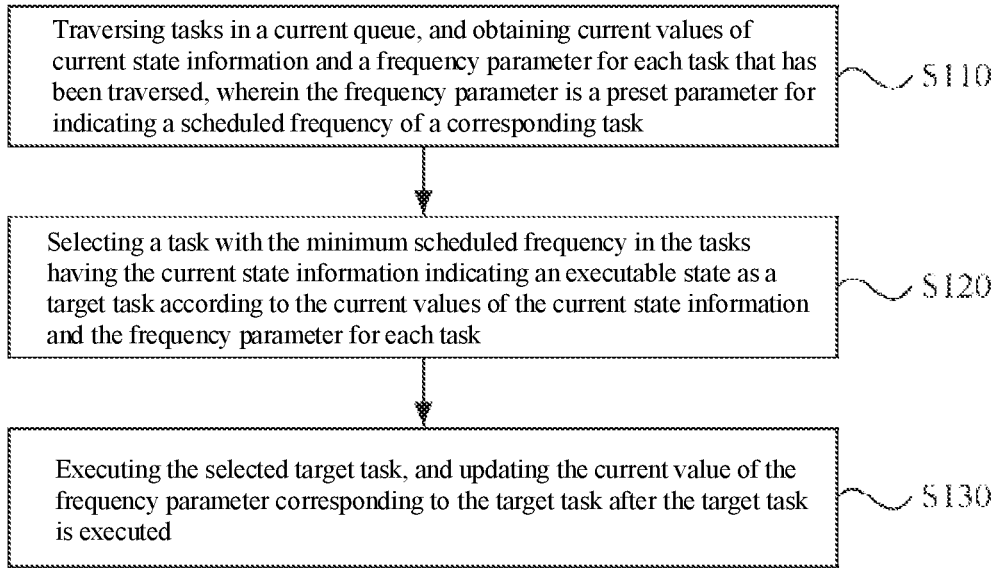
FIG. 1 is a flowchart of a task scheduling method according to a first embodiment of the present disclosure.

The embodiments of the present disclosure will be described in detail and examples of embodiments are illustrated in the drawings. The specific embodiments described herein merely serve to explain the present disclosure, and are not construed to limit the present disclosure. It should be noted that, for ease of description, only some, not all, of the structures related to the present disclosure are illustrated in the drawings.

First Embodiment

FIG. 1 is a flowchart of a task scheduling method according to a first embodiment of the present disclosure. The embodiment of the present disclosure is applicable to a case for scheduling tasks in a queue. The method may be performed by a task scheduling apparatus, which may be implemented in software and/or hardware and may be specifically disposed in an electronic device.

The electronic device may be a computer device having at least one algorithm module for processing a corresponding task. Each algorithm module processes a corresponding task by executing corresponding codes, and achieves corresponding effects.

As shown in FIG. 1, the task scheduling method comprises the following steps.

At S110, tasks in a current queue are traversed. Current values of current state information and a frequency parameter for each task that has been traversed are obtained. The frequency parameter is a preset parameter for indicating a scheduled frequency of a corresponding task.

Here, the queue is a special linear storage table, which only allows a deletion operation on a queue element at the front of the table (i.e., the head of the queue), and an insertion operation on a queue element at the end of the table (i.e., the tail of the queue). The queue element is a task corresponding to each algorithm module included in the electronic device.

The current state information is used to indicate a processing state of each task, including an executable state and a non-executable state. When a message notification for informing generation of input data corresponding to any task is received, the state of said task in the queue is changed to the executable state. The input data is data necessary for executing the corresponding task. The input data may be data generated by executing other tasks, data manually input by a user, data read locally from the electronic device, data read from other electronic devices associated with the electronic device, or data read from the network or the cloud. Specifically, when input data is stored, the message notification for the input data is generated. According to the generated message notification, the current value of the current state information of the task corresponding to the input data is changed to the executable state.

The frequency parameter may be an encoded value that is encoded according to a given encoding mechanism, which may be used to indicate the scheduled frequency of the corresponding task. Here, the encoding mechanism may be binary, octal, decimal, or hexadecimal.

Illustratively, when a current thread in a central processing unit (CPU) for processing respective tasks is informed that the input data necessary for executing the task, the state of said task in the queue is changed to the executable state. When a scheduling period starts, the corresponding thread traverses the tasks in the queue monitored by the thread, and obtains the current values of the current state information and the frequency parameter for each of the traversed task.

Illustratively, when a given thread in a monitoring message center monitors that the input data necessary for executing any task is stored into the message center, the given thread generates a message notification and sends it to a task scheduling thread. The task scheduling thread changes the state of said task in the queue to the executable state according to the received message notification. When the scheduling period starts, the queue in which the task is included is traversed, obtaining the current values of the current state information and the frequency parameter for each task that has been traversed.

Preferably, an initial value of the frequency parameter for each task in the current queue is identical. The initial value of the frequency parameter corresponds to a condition of each task before it is executed at the first time.

At S120, a task with the minimum scheduled frequency in the tasks having the current state information indicating an executable state is selected as a target task according to the current values of the current state information and the frequency parameter for each task.

Illustratively, during the traversing through the current queue, the current values of the current state information and the frequency parameter for each task included in the current queue are stored correspondingly. The tasks having the current state information indicating the executable state are obtained as selectable tasks. The current values of the frequency parameters for the selectable tasks are obtained. The selectable tasks with the minimum current value of the frequency parameter are selected as the tasks to be selected. When the tasks to be selected include only one task, it is directly selected as the target task. When the task to be selected includes at least one task, one of the tasks to be selected is selected as the target task according to a set selection rule. Alternatively, each of the tasks to be selected is taken as the target task. When the number of tasks to be selected is at least two, the corresponding set selection rule may include: selecting a task to be selected that has the traversal time value farthest from the traversal end time value; selecting a task to be selected that has the traversal time value closest to the traversal end time value; selecting a task to be selected randomly; or selecting a task with the highest priority among the tasks to be selected.

Illustratively, during the traversing through the current queue, when the current value of a first current state information is read out as being the executable state, the current value of the corresponding frequency parameter is stored as a minimum frequency parameter. The current values of the current state information and the frequency parameter for each task are continuously read out. When the current value of the current state information of a task is read out again as in the executable state, the current value of the corresponding frequency parameter is compared with the stored minimum frequency parameter. A smaller one of the two parameter values are obtained to update the minimum frequency parameter until all the tasks in the current queue are traversed. The task corresponding to the minimum frequency parameter is taken as the target task. Here, when the tasks corresponding to the minimum frequency parameter includes at least one task, one of the tasks corresponding to the minimum frequency parameter is selected as the target task according to the set selection rule. Alternatively, each task to be selected may be used as the target task. The task(s) corresponding to the minimum frequency parameter is used as the task to be selected. When the number of the tasks to be selected is at least two, the corresponding set selection rule may be: selecting a task to be selected that has the traversal time value farthest from the traversal end time value; selecting a task to be selected that has the traversal time value is closest to the traversal end time value; selecting a task to be selected randomly; or selecting the task with the highest priority among the tasks to be selected.

At S130, the selected target task is executed. The current value of the frequency parameter corresponding to the target task is updated after the target task is executed.

The target task is executed according to a task execution thread corresponding to the current queue. After the target task is executed, the value of the frequency parameter before the target task is executed is added by a unit frequency to update the current value of the frequency parameter of the target task. The unit frequency may be set by a developer.

In the embodiments of the present disclosure, the current values of the current state information and the frequency parameter for each traversed task are obtained by traversing the tasks in the current queue. A task with the minimum scheduled frequency in the tasks having the current state information indicating the executable state as the target task according to the current values of the current state information and the frequency parameter for each task. The selected target task is executed. The current value of the frequency parameter corresponding to the target task is updated after the target task is executed. By adopting the above solution, the target task may be determined by introducing the frequency parameter, which may solve the problem of unbalanced task scheduling in the related art and improve the stability of the task scheduling process.

Preferably, the task scheduling method according to the embodiments of the present disclosure may be applied to an unmanned vehicle system. The tasks in each queue stored in the unmanned vehicle system may comprise tasks corresponding to at least one of the following modules in the unmanned vehicle system: a sensing module, a planning module, a controlling module, a vehicle state detecting module, and a positioning module.

Second Embodiment

Figure 2:
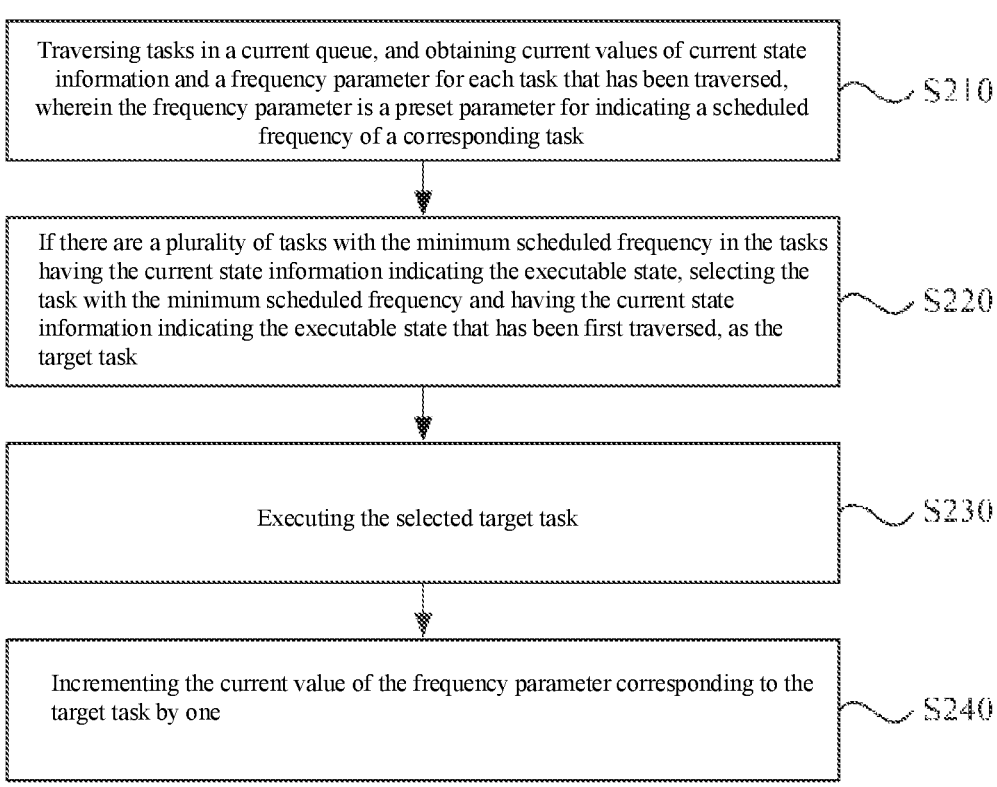
FIG. 2 is a flowchart of a task scheduling method according to a second embodiment of the present disclosure.

FIG. 2 is a flowchart of a task scheduling method according to a second embodiment of the present disclosure. The embodiment of the present disclosure is further subdivided and optimized on the basis of the technical solutions of the above embodiments.

Further, the operation of "selecting a task with the minimum scheduled frequency in the tasks having the current state information indicating an executable state as a target task" is subdivided into "if there are a plurality of tasks with the minimum scheduled frequency in the tasks having the current state information indicating the executable state, selecting a task with the minimum scheduled frequency and having the current state information indicating the executable state that has been first traversed, as the target task", so as to improve the selection mechanism for the target task, and to deal with the situation in which a plurality of tasks with the minimum scheduled frequency and having the current state information indicating the executable state are included.

Further, the operation of "updating the current value of the frequency parameter corresponding to the target task" is subdivided into "incrementing the current value of the frequency parameter corresponding to the target task by one, wherein the larger the value of the frequency parameter is, the larger the scheduled frequency of the corresponding task indicated by the value of the frequency parameter is, an initial value of the frequency parameter corresponding to each task in the current queue being zero", so as to improve the updating mechanism for the frequency parameter after the task is executed and to facilitate the loop execution of the task scheduling method.

As shown in FIG. 2, the task scheduling method comprises the following steps.

At S210, tasks in a current queue are traversed. Current values of the current state information and the frequency parameter for each task that has been traversed are obtained. The frequency parameter is a preset parameter for indicating a scheduled frequency of a corresponding task.

Here, the frequency parameter is encoded in decimal. The initial value of the frequency parameter is 0. The unit frequency is 1. That is, the execution number of the task is the as the current value of the frequency parameter corresponding to the task. That is, the larger the value of the frequency parameter is, the larger the scheduled frequency of the corresponding task indicated by the value of the frequency parameter is.

At S220, if there are a plurality of tasks with the minimum scheduled frequency in the tasks having the current state information indicating the executable state, a task with the minimum scheduled frequency and having the current state information indicating the executable state that has been first traversed is selected as the target task.

At S230, the selected target task is executed.

At S240, the current value of the frequency parameter corresponding to the target task is incremented by one.

In the embodiments of the present disclosure, a task with the minimum scheduled frequency and having the current state information indicating the executable state that has been first traversed is selected as the target task, which improve the selection mechanism for the target task and may deal with the situation in which a plurality of tasks with the minimum scheduled frequency and having the current state information indicating the executable state are included. Further, by setting the initial value of the frequency parameter for each task as being zero, and incrementing the current value of the frequency parameter of the target task by one after the execution of the target task is completed, the updating mechanism for the frequency parameter after the task is executed is improved, which also facilitates the loop execution of the task scheduling method.

Third Embodiment

Figure 3:
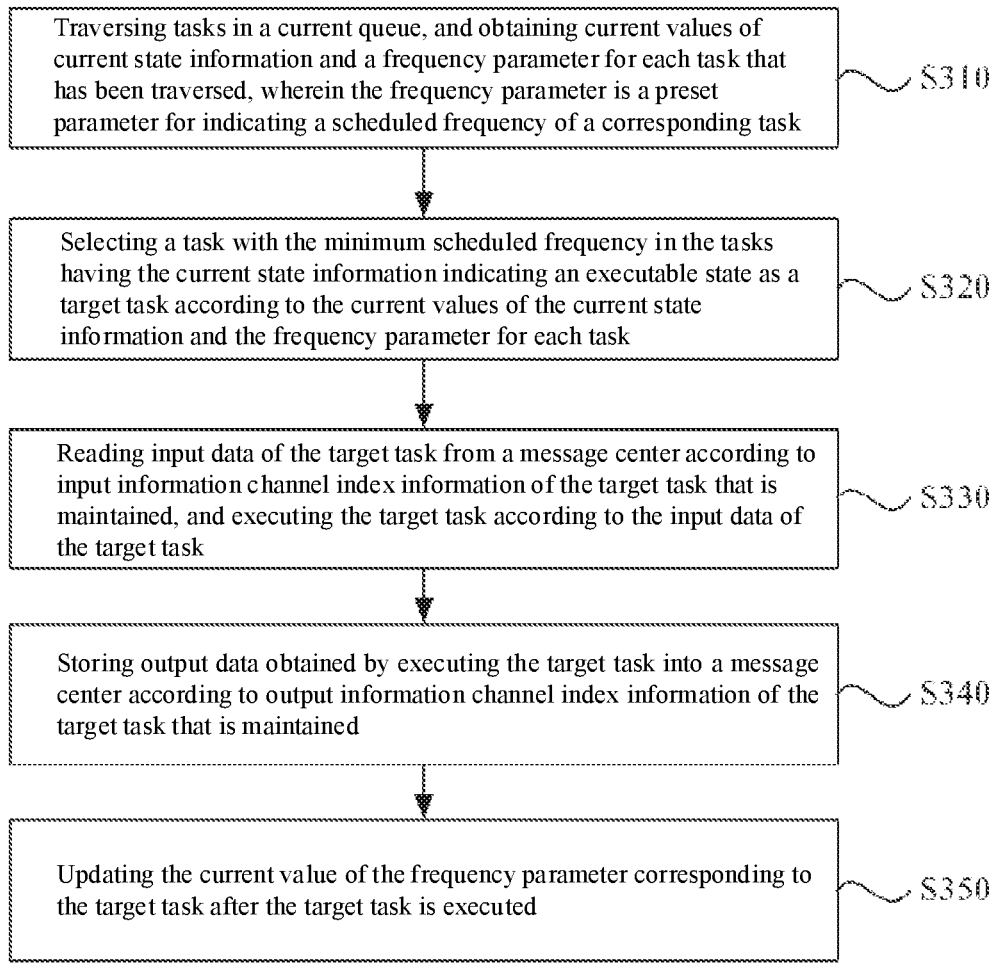
FIG. 3 is a flowchart of a task scheduling method according to a third embodiment of the present disclosure.

FIG. 3 is a flowchart of a task scheduling method according to a third embodiment of the present disclosure. The embodiment of the present disclosure is further subdivided and optimized on the basis of the technical solutions of the above embodiments.

Further, the operation of "executing the selected target task" is subdivided into "reading input data of the target task from a message center according to input information channel index information of the target task that is maintained, and executing the target task according to the input data of the target task, wherein the input information channel index information is used to indicate an address of a storage area for storing the input data of a corresponding task in the message center", so as to improve the execution mechanism of the target task, and to implement effective management of the input data while providing basis for the repairing, maintenance and performance evaluation of an electronic device.

Further, after the operation of "executing the selected target task", operations of "storing output data obtained by executing the target task into a message center according to output information channel index information of the target task that is maintained, wherein the output information channel index information is used to indicate an address of a storage area for storing the output data of the corresponding task in the message center" are further added, so as to improve the data storage mechanism after the target task is executed, and to realize effective management of the output data while providing basis for the repairing, maintenance and performance evaluation of an electronic device.

As shown in FIG. 3, the task scheduling method comprises the following steps.

At S310, tasks in a current queue are traversed. Current values of the current state information and the frequency parameter for each task that has been traversed are obtained. The frequency parameter is a preset parameter for indicating a scheduled frequency of a corresponding task.

Here, the current state information includes the executable state and the non-executable state.

At S320, a task with the minimum scheduled frequency in the tasks having the current state information indicating an executable state is selected as a target task according to the current values of the current state information and the frequency parameter for each task.

Here, when the message notification for informing the generation of the input data corresponding to any task is received, the state of said task in the queue is changed to the executable state. The input data is stored in a corresponding storage space in the message center. The message center may be a local storage area in the electronic device, or may be a storage area of other electronic devices associated with the electronic device.

When the input data of any task is stored in the message center, a management thread of the message center generates a message notification associated with said task to be sent to the task scheduling thread corresponding to said task, which in turn modifies the current value of the current state information for the task in the queue to the executable state.

At S330, the input data of the target task is read from the message center according to the input information channel index information of the target task that is maintained. The target task is executed according to the input data of the target task.

Here, the input information channel index information is used to indicate an address of a storage area for storing the input data of a corresponding task in the message center. The input data may be stored according to a read-write lock protection mechanism.

Illustratively, when the electronic device is applied to an unmanned aerial vehicle (UAV) system, the input data may be source information, destination information, map information for the area associated with the source and the destination, or the like when the UAV system plans the route.

Specifically, when the task scheduling thread corresponding to the target task receives the message notification of the input data, the input information channel index information corresponding to the target task is determined according to information maintained locally. The task scheduling thread reads the input data of the target task from the message center according to the determined input information channel index information.

At S340, the output data obtained by executing the target task is stored into the message center according to the output information channel index information of the target task that is maintained.

The output information channel index information is used to indicate an address of a storage area for storing the output data of the corresponding task in the message center.

Specifically, after the execution of the target task is completed, the task scheduling thread corresponding to the target task generates corresponding output data. The task scheduling thread determines the corresponding output information channel index information based on the input information channel index information or information channel identification information of the target task. The generated output data is stored into the storage area in the message center corresponding to the output information channel index information.

The output data may be used as intermediate data in the task scheduling process, i.e., the input data of other tasks associated with the target task, and may also be used as record data of the task scheduling for the subsequent searching and comparison of the output data, which may provide a basis for the repairing, maintenance, and performance evaluation in an electronic device. The output data may be stored according to a read-write lock protection mechanism.

At S350, the current value of the frequency parameter corresponding to the target task is updated after the target task is executed.

In the embodiments of the present disclosure, the input data of the target task is read from the message center according to output information channel index information of the target task that is maintained. The target task is executed according to the read input data. This may improve the execution mechanism of the target task, and may implement effective management of the input data while providing basis for the repairing, maintenance and performance evaluation of an electronic device. Further, the output data obtained by executing the target task is stored into a message center according to output information channel index information of the target task that is maintained, which may improve the data storage mechanism after the target task is executed, and realize effective management of the output data while providing basis for the repairing, maintenance and performance evaluation of an electronic device.

Fourth Embodiment

Figure 4:
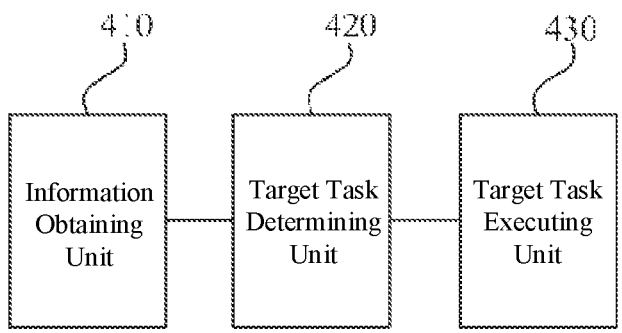
FIG. 4 is a structural diagram of a task scheduling apparatus according to a fourth embodiment of the present disclosure.

FIG. 4 is a structural diagram of a task scheduling apparatus according to a fourth embodiment of the present disclosure. The embodiment of the present disclosure is applicable to the case for scheduling tasks in a queue. The apparatus may be implemented in software and/or hardware, and may be specifically disposed in an electronic device. The task scheduling apparatus shown in FIG. 4 comprises an information obtaining unit 410, a target task determining unit 420, and a target task executing unit 430.

The information obtaining unit 410 is configured to traverse tasks in a current queue, and to obtain current values of current state information and a frequency parameter for each task that has been traversed. The frequency parameter is a preset parameter for indicating a scheduled frequency of a corresponding task.

The target task determining unit 420 is configured to select a task with the minimum scheduled frequency in the tasks having the current state information indicating an executable state as a target task according to the current values of the current state information and the frequency parameter for each task.

The target task executing unit 430 is configured to execute the selected target task, and to update the current value of the frequency parameter corresponding to the target task after the target task is executed.

In the embodiments of the present disclosure, the current values of the current state information and the frequency parameter for each traversed task are obtained by traversing the tasks in the current queue via the information obtaining unit. A task with the minimum scheduled frequency in the tasks having the current state information indicating the executable state as the target task according to the current values of the current state information and the frequency parameter for each task via the target task determining unit.

The selected target task is executed, and the current value of the frequency parameter corresponding to the target task is updated after the target task is executed via the target task executing unit. By adopting the above solution, the target task may be determined by introducing the frequency parameter, which may solve the problem of unbalanced task scheduling in the related art and improve the stability of the task scheduling process.

Further, the target task determining unit 420 is specifically configured to select a task with the minimum scheduled frequency and having the current state information indicating the executable state that has been first traversed, as the target task if there are a plurality of tasks with the minimum scheduled frequency in the tasks having the current state information indicating the executable state.

Further, the apparatus comprises a state changing unit, configured to change the state of said task in the queue to the executable state when a message notification for informing generation of input data corresponding to any task is received.

Further, the target task executing unit 430 comprises an input data reading subunit, configured to read input data of the target task from a message center according to input information channel index information of the target task that is maintained, and to execute the target task according to the input data of the target task.

The input information channel index information is used to indicate an address of a storage area for storing the input data of a corresponding task in the message center.

Further, the apparatus comprises an output data storage unit, configured to store output data obtained by executing the target task into a message center according to output information channel index information of the target task that is maintained after the selected target task is executed;

The output information channel index information is used to indicate an address of a storage area for storing the output data of the corresponding task in the message center.

Further, the target task executing unit 430 comprises a frequency parameter updating subunit, configured to increment the current value of the frequency parameter corresponding to the target task by one.

The larger the value of the frequency parameter is, the larger the scheduled frequency of the corresponding task indicated by the value of the frequency parameter is. An initial value of the frequency parameter corresponding to each task in the current queue is zero.

Further, the apparatus is applied to an unmanned vehicle system.

The tasks comprise tasks corresponding to at least one of the following modules in the unmanned vehicle system: a sensing module, a planning module, a controlling module, a vehicle state detecting module, and a positioning module.

The above task scheduling apparatus may perform the task scheduling method according to all the above embodiments of the present disclosure, and includes corresponding functional modules for performing the above task scheduling method, to achieve the corresponding beneficial effects. As for the technical details that are not described in detail in this embodiment, reference may be made to the task scheduling method according to all the above embodiments of the present disclosure.

Fifth Embodiment

Figure 5:
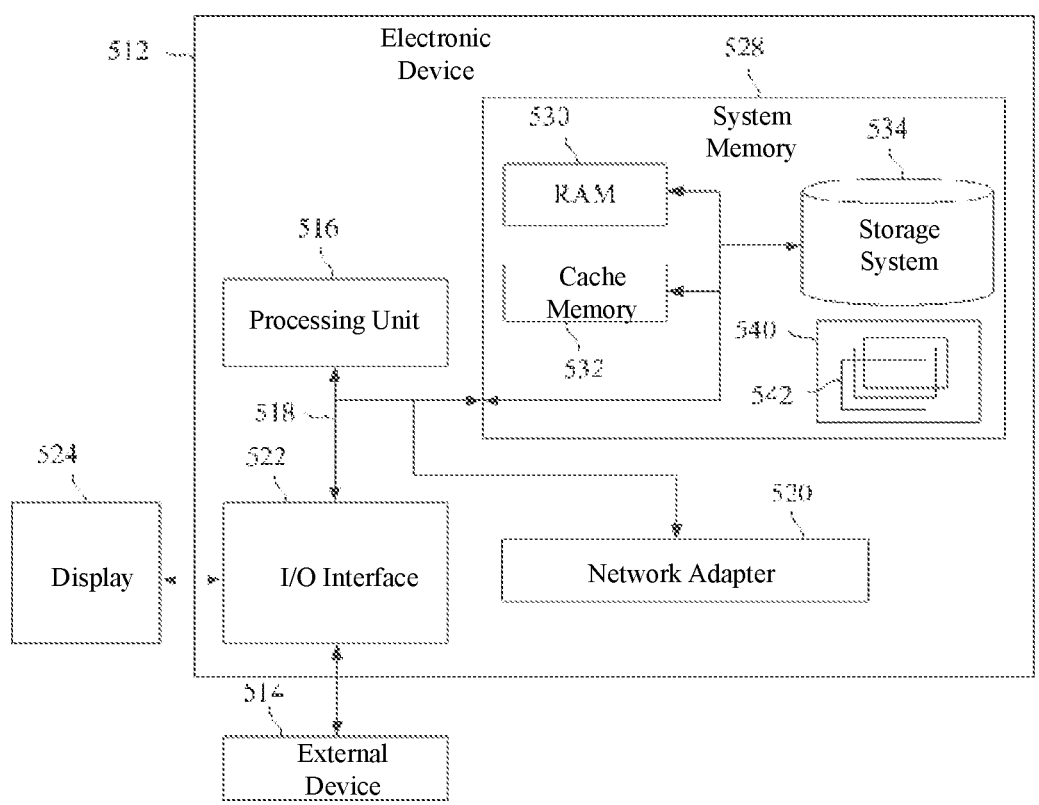
FIG. 5 is a structural diagram of an electronic device according to a fifth embodiment of the present disclosure.

FIG. 5 is a structural diagram of an electronic device according to a fifth embodiment of the present disclosure. FIG. 5 illustrates a block diagram of an exemplary electronic device 512 adapted for implementing the embodiments of the present disclosure. The electronic device 512 shown in FIG. 5 is merely an example and should not impose any limitation on the function and usage of the embodiments of the present disclosure.

As shown in FIG. 5, the electronic device 512 is implemented as a general-purpose computing device. Components of the electronic device 512 may include, but are not limited to, one or more processors or processing units 516, a system memory 528, and a bus 518 that connects various system components, including the system memory 528 and the processing unit 516.

The bus 518 may be implemented as one or more bus architectures, including a storage device bus or a storage device controller, a peripheral bus, an accelerated graphics port, a processor, or a local bus with any of the bus architectures. For example, the bus architectures include, but not limited to, an industry subversive alliance (ISA) bus, a micro channel architecture (MAC) bus, an enhanced ISA bus, a video electronics standards association (VESA) local bus and a peripheral component interconnect (PCI) bus.

The electronic device 512 typically includes a variety of computer system readable medium. Those medium may be any available medium that may be accessed by the electronic device 512, including volatile and non-volatile mediums, removable and non-removable mediums.

The system memory 528 may include a computer system readable medium in the form of volatile memory, such as a random access memory (RAM) 530 and/or a cache memory 532. The electronic device 512 may further include other removable/non-removable and volatile/non-volatile computer system storage media. As an example only, a storage system 534 may be configured to read from or write to a non-removable and non-volatile magnetic medium (not shown in FIG. 5, and generally referred as a "hard disk drive"). Although not shown in FIG. 5, a magnetic-disk drive configured to read from or write to a removable and nonvolatile magnetic disk (for example, a "floppy disk"), and an optical-disk drive configured to read from or write to a removable and nonvolatile optical disk, such as a compact disc read-only memory (CD-ROM), a digital video disc-read only memory (DVD-ROM), or other optical media, may be provided. In those cases, each drive may be connected to a bus 518 through one or more data medium interfaces. The system memory 528 may include at least one program product having a set of (e.g., at least one) program modules configured to perform functions in respective embodiments of the present disclosure.

The program/utility 540 including a set of (at least one) program modules 542, may be stored, for example, in the system memory 528, such program module 542 includes, but is not limited to, an operation system, one or more applications, other program modules and program data. Each or a certain combination of the examples may include an implementation of a network environment. The program module 542 typically performs the functions and/or methods in the embodiments described herein.

The electronic device 512 may further communicate with one or more external devices (e.g., a keyboard, a pointing device, a display 524), and communicate with one or more terminals that enable the user to interact with the terminal device 512, and/or communicate with any terminals, such as a network card, a modem, or the like, that enable the computer device 512 to communicate with one or more other computer terminals. Such communication may be implemented through an input/output (I/O) interface 522. Moreover, the electronic device 512 may also communicate with one or more networks, such as a local area network (LAN), a wide area network (WAN), and/or a public network, such as the Internet, through the network adapter 520. As shown, the network adapter 520 communicates with other modules of the electronic device 512 via the bus 518. It should be understood that although not shown in the figures, other hardware and/or software modules may be utilized in combination with the electronic device 512, including but not limited to: a microcode, a terminal driver, a redundant processor, an external disk drive array, a redundant-arrays-of-independent-disks (RAID) system, a tape drive, and a data backup storage system.

The processing unit 516 performs various functional applications and data processing by running programs stored in the system memory 528, for example, for implementing the control method mentioned in the above embodiments.

The embodiments of the present disclosure further provide a vehicle, including a vehicle body, and the above electronic device.

Embodiment 6

The embodiment 6 of the present disclosure provides a computer readable storage medium having computer programs stored thereon, and when the program is executed by the processor, the task scheduling method according to any embodiment of the present disclosure may be implemented. The method comprises: traversing tasks in a current queue, and obtaining current values of current state information and a frequency parameter for each task that has been traversed, wherein the frequency parameter is a preset parameter for indicating a scheduled frequency of a corresponding task; selecting a task with the minimum scheduled frequency in the tasks having the current state information indicating an executable state as a target task according to the current values of the current state information and the frequency parameter for each task; and executing the selected target task, and updating the current value of the frequency parameter corresponding to the target task after the target task is executed.

The computer storage medium of the embodiments of the present disclosure may employ any combination of one or more computer readable mediums. The computer readable medium may be a computer readable signal medium or a computer readable storage medium. The computer readable storage medium may be, for example, but not limited to, an electronic, magnetic, optical, electromagnetic, infrared, or semiconductor system, apparatus, or device, or any combination of the above. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the above. In the present disclosure, a computer readable storage medium may be any tangible medium that may contain or store a program, which may be used by or in combination with an instruction execution system, apparatus or device.

A computer readable signal medium may include a data signal that is propagated in a baseband or as part of a carrier, carrying computer readable program codes. The data signal propagated in this manner may adopt a plurality of forms including, but not limited to, an electromagnetic signal, an optical signal, or any suitable combination thereof. The computer readable signal medium may also be any computer readable medium other than a computer readable storage medium. The computer readable medium may send, propagate, or transmit a program to be utilized by or in connection with an instruction execution system, apparatus, or device.

Program codes contained in the computer readable medium may be transmitted over any suitable media, including but not limited to a wireless connection, a wired connection, a fiber optic cable, RF, or any suitable combination thereof.

Computer program codes for performing the operations of the present disclosure may be written in one or more programming languages, or a combination thereof, including an object-oriented programming language such as Java, Smalltalk, C++, and conventional procedural programming languages such as the C language or the like. The program codes may be entirely executed on the user's computer, partly executed on the user's computer, executed as a stand-alone software package, executed partly on the user's computer and partly on a remote computer, or entirely executed on the remote computer or terminal. In the case of a remote computer, the remote computer may be connected to the user's computer through any kind of network, including a local area network (LAN) or a wide area network (WAN), or may be connected to an external computer (e.g., using internet connection provided by an Internet service provider).

Note that the above are only the preferred embodiments of the present disclosure and the technical principles applied thereto. Those skilled in the art will appreciate that the present disclosure is not limited to the specific embodiments described herein, and that various modifications, changes and substitutions may be made without departing from the scope of the invention. Therefore, the present invention has been described in detail by the above embodiments, but the present invention is not limited to the above embodiments, and other equivalent embodiments may be included without departing from the inventive concept. The scope is determined by the scope of the appended claims.

What is claimed is:

1. A task scheduling method, comprising:
   traversing tasks in a current queue, and obtaining current values of current state information and a frequency parameter for each task that has been traversed, wherein the frequency parameter is a preset parameter for indicating a scheduled frequency of a corresponding task;
   selecting a task with the minimum scheduled frequency in the tasks having the current state information indicating an executable state as a target task according to the current values of the current state information and the frequency parameter for each task; and
   executing the selected target task, and updating the current value of the frequency parameter corresponding to the target task after the target task is executed.

2. The method according to claim 1, wherein selecting the task with the minimum scheduled frequency in the tasks having the current state information indicating the executable state as the target task, comprises:
   if there are a plurality of tasks with the minimum scheduled frequency in the tasks having the current state information indicating the executable state, selecting the task with the minimum scheduled frequency and having the current state information indicating the executable state that has been first traversed, as the target task.

3. The method according to claim 1, further comprising:
when a message notification for informing generation of input data corresponding to any task is received, changing the state of said task in the queue to the executable state.

4. The method according to claim 1, wherein executing the selected target task, comprises:
reading input data of the target task from a message center according to input information channel index information of the target task that is maintained, and executing the target task according to the input data of the target task,
wherein the input information channel index information is used to indicate an address of a storage area for storing the input data of a corresponding task in the message center.

5. The method according to claim 1, wherein executing the selected target task, comprises:
storing output data obtained by executing the target task into a message center according to output information channel index information of the target task that is maintained,
wherein the output information channel index information is used to indicate an address of a storage area for storing the output data of the corresponding task in the message center.

6. The method according to claim 1, wherein updating the current value of the frequency parameter corresponding to the target task, comprises:
incrementing the current value of the frequency parameter corresponding to the target task by one,
wherein the larger the value of the frequency parameter is, the larger the scheduled frequency of the corresponding task indicated by the value of the frequency parameter is, an initial value of the frequency parameter corresponding to each task in the current queue being zero.

7. The method according to claim 1, wherein the method is applied to an unmanned vehicle system,
wherein the tasks comprise tasks corresponding to at least one of the following modules in the unmanned vehicle system: a sensing module, a planning module, a controlling module, a vehicle state detecting module, and a positioning module.

8. A task scheduling apparatus, comprising:
one or more processors;
a memory, configured to store one or more programs;
wherein, when the one or more programs are executed by the one or more processors, the one or more processors are configured to implement a task scheduling method, comprising:
traversing tasks in a current queue, and obtaining current values of current state information and a frequency parameter for each task that has been traversed, wherein the frequency parameter is a preset parameter for indicating a scheduled frequency of a corresponding task;
selecting a task with the minimum scheduled frequency in the tasks having the current state information indicating an executable state as a target task according to the current values of the current state information and the frequency parameter for each task; and
executing the selected target task, and updating the current value of the frequency parameter corresponding to the target task after the target task is executed.

9. A non-transitory computer readable storage medium having a computer program stored thereon, wherein when the program is executed by a processor, the program implements a task scheduling method, comprising:
traversing tasks in a current queue, and obtaining current values of current state information and a frequency parameter for each task that has been traversed, wherein the frequency parameter is a preset parameter for indicating a scheduled frequency of a corresponding task;
selecting a task with the minimum scheduled frequency in the tasks having the current state information indicating an executable state as a target task according to the current values of the current state information and the frequency parameter for each task; and
executing the selected target task, and updating the current value of the frequency parameter corresponding to the target task after the target task is executed.

* * * * *